(12) United States Patent
Feng et al.

(10) Patent No.: US 10,160,435 B2
(45) Date of Patent: Dec. 25, 2018

(54) HOVERCRAFT USING SINGLE DUCTED FAN WITH VECTORING PROPULSION

(71) Applicant: FOSHAN QUARK BROTHER TECHNOLOGY CO., LTD., Foshan, Guangdong (CN)

(72) Inventors: Hongtao Feng, Jiangmen (CN); Jiansheng Wang, Jiangmen (CN); Xianmin Kang, Jiangmen (CN); Zhongfeng Li, Jiangmen (CN)

(73) Assignee: FOSHAN QUARK BROTHER TECHNOLOGY CO., LTD., Guangdong (CN)

( * ) Notice: Subject to any disclaimer, the term of this patent is extended or adjusted under 35 U.S.C. 154(b) by 67 days.

(21) Appl. No.: 15/325,220

(22) PCT Filed: Oct. 21, 2015

(86) PCT No.: PCT/CN2015/092450
§ 371 (c)(1),
(2) Date: Jan. 10, 2017

(87) PCT Pub. No.: WO2017/063205
PCT Pub. Date: Apr. 20, 2017

(65) Prior Publication Data
US 2017/0297550 A1    Oct. 19, 2017

(30) Foreign Application Priority Data

Oct. 14, 2015  (CN) .......................... 2015 1 0666848

(51) Int. Cl.
*B60V 1/14*    (2006.01)
*B60V 3/02*    (2006.01)
(Continued)

(52) U.S. Cl.
CPC .................. *B60V 1/14* (2013.01); *B60V 3/02* (2013.01); *B60V 3/06* (2013.01); *B63H 11/12* (2013.01);*B60V 1/04* (2013.01); *B60V 1/18* (2013.01); *B64C 27/20* (2013.01)

(58) Field of Classification Search
CPC .. B60V 1/043; B60V 1/14; B63H 7/02; B64C 29/0025
See application file for complete search history.

(56) References Cited

U.S. PATENT DOCUMENTS 3,398,809 A * 8/1968 Wood ..................... B60V 1/043
                                                        180/119
3,608,662 A * 9/1971 Ferguson ................. B60V 1/14
                                                        180/117
(Continued)

*Primary Examiner* — Joseph M Rocca
*Assistant Examiner* — Daniel S Yeagley
(74) *Attorney, Agent, or Firm* — Westerman, Hattori, Daniels & Adrian, LLP

(57) ABSTRACT

The invention discloses a hovercraft using single ducted fan with vectoring propulsion, including a hull and a single ducted fan arranged on the hull, wherein the single ducted fan comprises barrel shaped shell and oar-blade component arranged in chamber of the shell, a first air outlet is disposed on one side of shell towards the tail end of the hull, diversion rudders enabling to block the first air outlet are disposed on the shell, two first air guide all connected with chamber of the shell is disposed on both sides of the shell, a second air outlet towards external of the single ducted fan is disposed on the first air guide, and the second air outlet and the first air outlet are arranged in reverse or with an included angle greater than 0 degree.

9 Claims, 3 Drawing Sheets

(51) Int. Cl.
  *B60V 3/06* (2006.01)
  *B63H 11/12* (2006.01)
  *B60V 1/04* (2006.01)
  *B60V 1/18* (2006.01)
  *B64C 27/20* (2006.01)

(56) References Cited

U.S. PATENT DOCUMENTS

| | | | | |
|---|---|---|---|---|
| 3,861,491 A * | 1/1975 | Ferguson | ............... | B60V 1/043 180/120 |
| 4,111,277 A * | 9/1978 | Peissel | ................... | B60V 1/043 180/122 |
| 4,421,489 A * | 12/1983 | Van Veldhuizen | ....... | B60V 1/14 114/150 |
| 4,643,268 A * | 2/1987 | Jones | ...................... | B60V 1/14 104/23.2 |
| 5,005,660 A * | 4/1991 | Yoshida | ................... | B60V 1/14 180/117 |
| 5,042,605 A * | 8/1991 | Moriwake | ................ | B60V 1/14 180/117 |
| 5,096,012 A * | 3/1992 | Chia | ........................ | B60V 1/14 180/117 |
| 5,097,919 A * | 3/1992 | Cox | ........................ | B60V 1/14 180/117 |
| 5,267,626 A * | 12/1993 | Tanfield, Jr. | ........... | B60V 1/043 180/117 |
| 7,101,235 B2 * | 9/2006 | Baldwin | .................. | B63H 7/02 440/37 |
| 2010/0051753 A1 * | 3/2010 | Yoeli | .................. | B64C 29/0025 244/23 A |

* cited by examiner ved the hull is floating to the air; another portion of airstream is guided by the first air guide 213, and provides propulsion airstream to the second air outlet 214 after blocked by the diversion rudder 212, thereby driving the hovercraft to navigate and turn. The diversion rudder 212 can also adjust the direction of propulsion airstream to reverse the hull. The chamber of the shell 21 presents a cone shape, in which the inner diameter decreases gradually in the direction of air inlet of the shell 21 towards the first air outlet 211.

HOVERCRAFT USING SINGLE DUCTED FAN WITH VECTORING PROPULSION

FIELD OF THE INVENTION

The invention relates to a hovercraft, particularly to a hovercraft using single ducted fan with vectoring propulsion.

BACKGROUND OF THE INVENTION

A plurality of power devices in coordination with diversion channels at multiple directions are adopted in a existing air-cushion vehicle or small hovercraft to achieve propulsion, hovering, steering, reverse and the like operation of the hovercraft. However, the power devices will cause the hovercraft having large weight and complex structure, resulting in cost increase, service difficulty, unstable operation of navigation, stiff steering and so on. Therefore, technology problems to be solved urgently are simplifying the hovercraft structure and making better driving stability of the hovercraft.

SUMMARY OF THE INVENTION

The invention provides a new-concept hovercraft using single ducted fan with vectoring propulsion to overcome the defects as mentioned above.

The invention is implemented according to the following technical solution:

a hovercraft using single ducted fan with vectoring propulsion comprises a hull and a single ducted fan arranged on the hull, wherein the single ducted fan comprises a barrel shaped shell and an oar-blade component arranged in a chamber of the shell, wherein a first air outlet is disposed on one side of shell towards the tail end of the hull, wherein diversion rudders enabling to block the first air outlet are disposed on the shell, wherein two first air guide all are connected with chamber of the shell and disposed on both sides of the shell, wherein a second air outlet is disposed on the first air guide towards external of the single ducted fan, wherein the second air outlet and the first air outlet are arranged in reverse or with an included angle greater than 0 degree.

Preferably, an air-flow passage is arranged on bottom of the hull for air supply of air cushion, wherein a second air guide connected with air-flow passage is arranged on the bottom of chamber of the shell, wherein air-inducing plate is arranged on air inlet of second air guide for allowing mobile air of chamber of the shell enter the second air guide.

Preferably, air-inducing plate is arc-shape, and projects back towards the air inlet of the second air guide.

Preferably, the projection area of air-inducing plate towards air inlet of the second air guide is ½~⅓ of the air inlet area.

Preferably, the number of diversion rudder is two, and the diversion rudders are symmetrically arranged with respect to the center axis of the shell.

Preferably, the two first air guide are symmetrically arranged with respect to the center axis of the shell.

Preferably, a rotation shaft guiding the diversion rudder rotating is arranged on the first air outlet, and a first motor for driving the rotation shaft rotating is arranged on the shell.

Preferably, the first motor drove rotation shaft is controlled by a control device arranged on the forehead of the hull.

Preferably, the chamber of the shell presents a cone shape, in which the inner diameter decreases gradually in the direction of air inlet of the shell towards the first air outlet.

Preferably, the oar-blade component is driven by a second motor, wherein the oar-blade component and the second motor both are driven by means of belt transmission.

Compared with the prior art, the beneficial effects of the invention lie in that: the hovercraft of the invention just needs one single ducted fan in collaboration with first air outlet, second air outlet, first air guide, second air guide and diversion rudder to implement propulsion, hovering, steering and reverse of hovercraft and so forth; while the number of diversion rudder is two which centers on axis of the shell and bilateral symmetry, the interaction between two diversion rudder will vector propulsion the hovercraft to any angle. The hovercraft of the invention has the advantages of simple structure and convenient maintenance, and as the hovercraft with single ducted fan does not exist dynamic interference effects, the process of moving will be more stable.

BRIEF DESCRIPTION OF THE DRAWINGS

Embodiments of the invention will be described in detail in combination with the accompanying drawings, wherein.

DETAILED DESCRIPTION OF THE EMBODIMENTS

Figure 1:
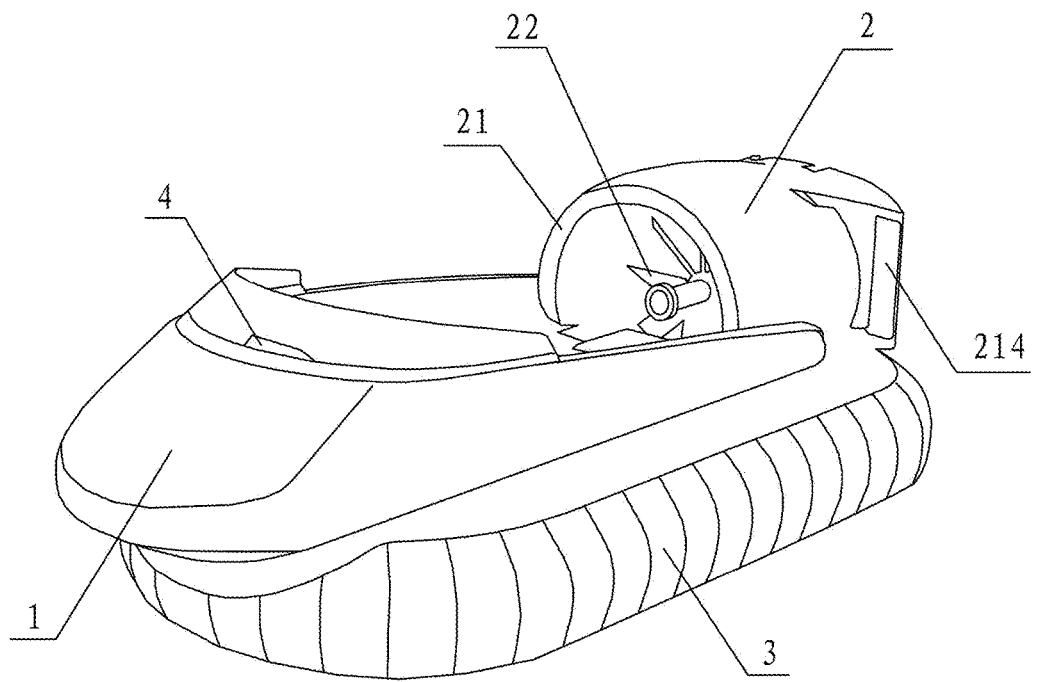
FIG. 1 is a structure diagram of a hovercraft using single ducted fan with vectoring propulsion.
Figure 2:
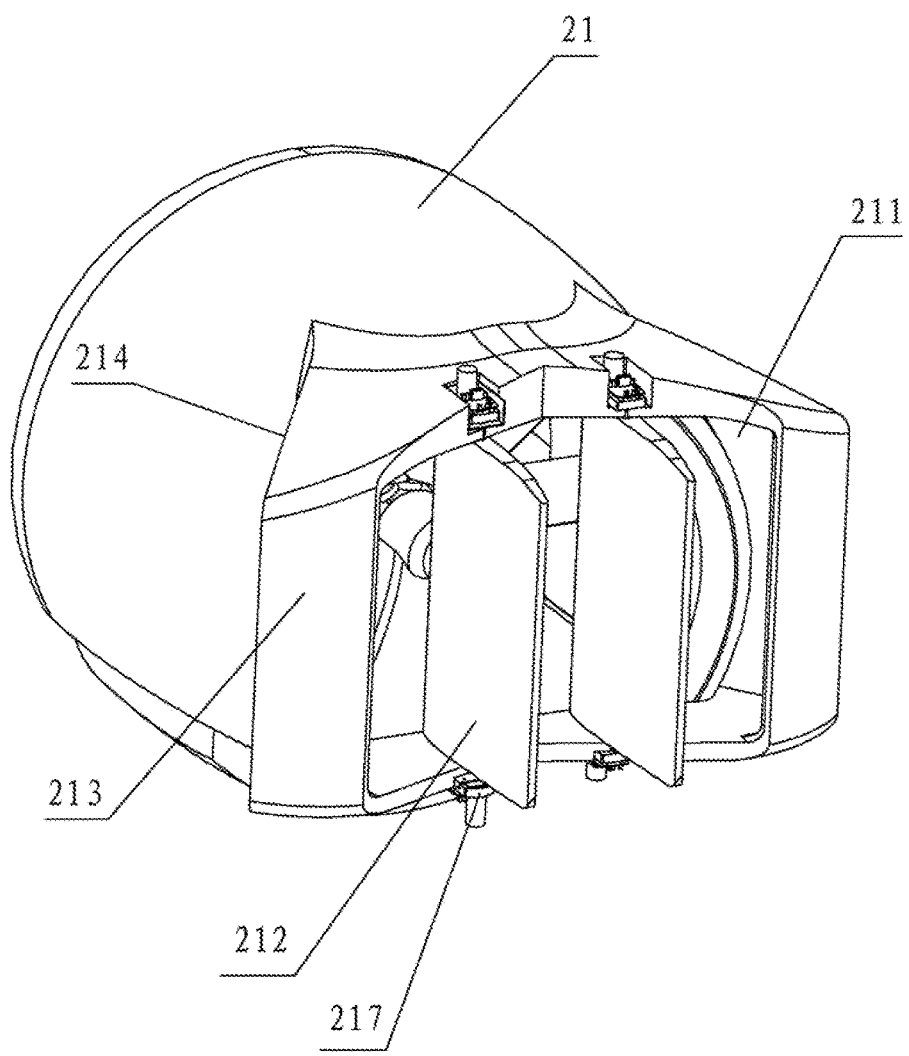
FIG. 2 is a structure diagram of a single ducted fan.
Figure 3:
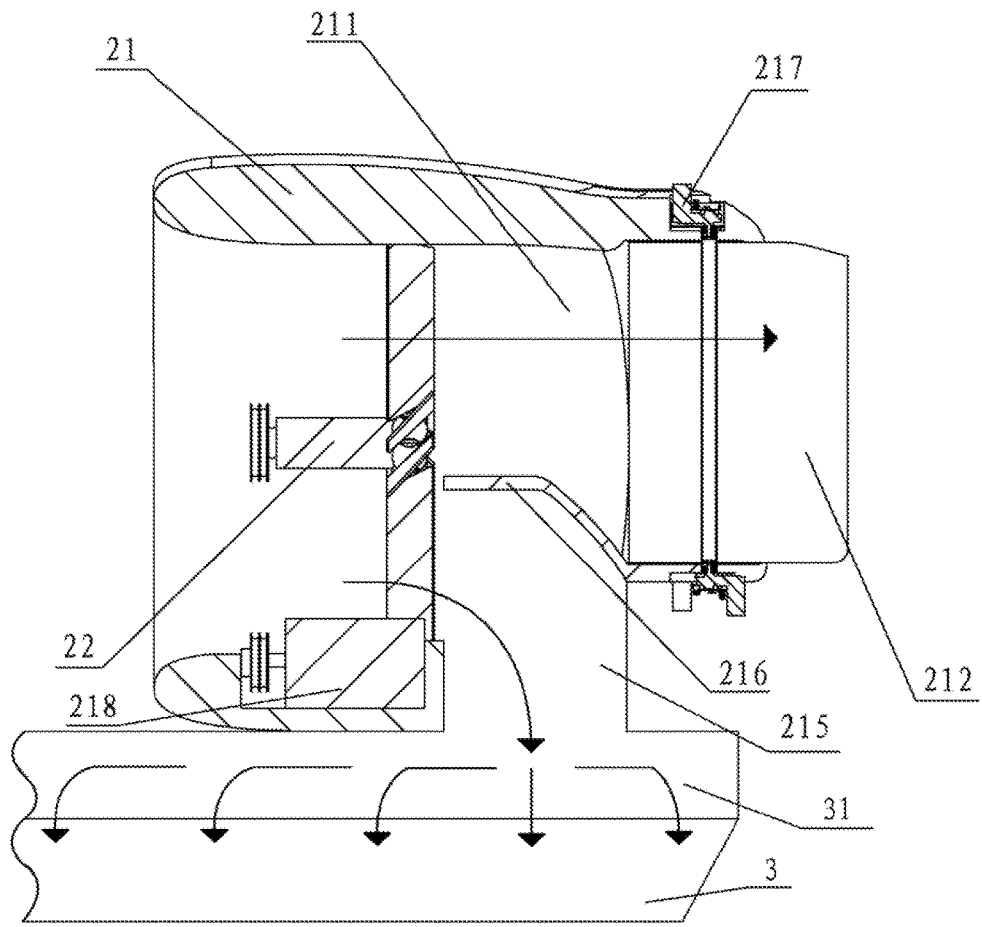
FIG. 3 is a cross-sectional view of axis section along vertical direction of the single ducted fan.

A hovercraft using single ducted fan with vectoring propulsion is shown in FIGS. 1-3 comprises a hull 1 and a single ducted fan 2 arranged on hull 1, wherein the single ducted fan 2 comprises a barrel shaped shell 21 and an oar-blade component 22 arranged in the chamber of the shell 21, wherein a first air outlet 211 is disposed on one side of the shell 21 towards the tail end of the hull 1, wherein airstream provided by the single ducted fan 2 through the first air outlet 211 forms propulsion airstream to drive the hovercraft forward. Diversion rudders 212 enabling to block the first air outlet 211 are disposed on the shell 21; two first air guides connected with the chamber of the shell 21 are respectively disposed on both sides of the shell 21; a second air outlet 214 towards external of the single ducted fan 2 is disposed on the first air guide 213; airflow prevented by the diversion rudder 212 under the guidance of the first air guide 213 ejects in the second air outlet 214. The second air outlet 214 and the first air outlet 211 can be arranged in reverse or with an included angle greater than 0 degree, i.e., the degree of the angle range is 0~90.

An air-flow passage 31 for supplying air to an air cushion 3 is arranged on the bottom of the hull 1; a second air guide 215 connected with air-flow passages 31 is arranged on the bottom of chamber of the shell 21; an air-inducing plate 216 is arranged on the air inlet of the second air guide 215 so as to allow the flowing air in the chamber of the shell 21 to enter the second air guide 215; the air-inducing plate 216 can be arc-shape for reducing resistance of propulsion airstream, and project back towards the air inlet of the second air guide 215. Under the guidance of the air-inducing plate 216, a portion of the airstream provided by the single ducted fan 2 enters the second air guide 215, then provides air supply for air cushion through air-flow passages 31 and hovering air-flow to make the hovercraft floating in the water or on land. The projection area of the air-inducing plate 216 towards the inlet of the second air guide 215 is ⅓~½ of the air inlet area.

Preferably, there are two diversion rudders 212, so that the combination of the two diversion rudders 212 cannot only block the first air outlet 211, but also implement steering by opening one of the diversion rudders 212 and closing another of them. As comprised to the other number of the diversion rudders 212, two diversion rudders 212 having the same function are more conducive in operation for a driver. Specifically, the two diversion rudders 212 are vertically and symmetrically arranged with respect to the center axis of the shell 21, which can contribute better steady to the hovercraft when it straight goes forward or backward. More specifically, the vertical arrangement of the two diversion rudder 212 is capable of more uniform distribution of right and left air-flow flowed from the first air outlet 211 and better steering steady.

Preferably, the two first air guides 213 are symmetrically arranged with respect to the center axis of the shell, which helps the driver to control the steering of the hovercraft steadily.

A rotation shaft allowing the rotation of the diversion rudder 212 is arranged on the first air outlet 211, and a first motor 217 for driving the rotation shaft rotating is arranged on the shell 21, wherein the first motor 217 changes deflection angle of diversion rudder 212 to control driving direction and speed of the hovercraft. The first motor 217 is preferably arranged on the rotation shaft of the diversion rudder, in order to control the rotation of diversion rudder conveniently. The first motor 217 is controlled by a control device 4 on the hull 1, where the control device 4 is arranged preferably on the forehead of the hull 1 so that the driver can remotely control the driving direction and speed of the hovercraft with clear view.

The chamber of the shell 21 presents a cone shape, in which the inner diameter decreases gradually in the direction of air inlet of the shell 21 towards the first air outlet 211, and the cone-shaped structure can allow air flow provided by single ducted fan 2 preliminary compressed in chamber of the shell 21 to enhance propulsion thrust of airflow. The oar-blade component 22 is driven by the second motor 218 by means of belt transmission, so that the second motor 218 in such arrangement will not block the airflow provided by the single ducted fan 2. The second motor can be arranged on the bottom of the shell 21.

In the embodiment, the operation principles of the hovercraft during steering and going forward and backward are described as follows that: the second motor 218 is driven to rotate the oar-blade component 22, then the single ducted fan 2 is initiated to provide airflow such that the airflow is preliminary compressed in the chamber of the shell 21, then ejects through the first air outlet 211 and reacts a forward thrust to the hull 1. The first motor 217 controls rotation of diversion rudder on both sides to allow the hovercraft advance at full speed as the first air outlet 211 in the largest open position. When the first motor 217 controls one of the diversion rudders 212 on one side to rotate for closing the first air outlet 211, and the other of the diversion rudders 212 on the other side to rotate for letting first air outlet 211 located in the largest open position, the airflow of the single ducted fan 2 allocated a portion of airflow of one end of the closed diversion rudder 212 with single ducted fan 2 allocated one end of the opening diversion rudder 212 ejects from the first air outlet 211. So a thrust force deviating from the axis of the hovercraft will be in one side of the opening diversion rudder 212, which provides vector thrust needed by hovercraft steering. The hovercraft beginning to steer or reverse end to end, when the right diversion rudder 212 is closed, turns right instead of turns left, vice versa. While first motor 217 controls the diversion rudder 212 on both sides to block first air outlet 211 totally, airflow provided by single ducted fan 2 through first air guide 213 at each end of shell 21 of the hovercraft ejects from second air outlet 214, at the moment what airflow provide is a resistance force to resist the hovercraft forward, then hovercraft begins decelerating, stopping and retreating.

The foregoing embodiment is just to illustrate the technical proposal rather than limiting. Any modification or equivalent replacement without departing from the spirit or scope thereof shall be within the scope of the technical solution of the invention.

The invention claimed is:

1. A hovercraft using single ducted fan with vectoring propulsion, comprising a hull and a single ducted fan arranged on the hull, wherein
   the single ducted fan comprises a barrel shaped shell and an oar-blade component arranged in a chamber of the shell,
   a first air outlet is disposed on one side of the shell towards the tail end of the hull,
   two diversion rudders enabling to block the first air outlet are disposed on the shell, the two diversion rudders rotating independently,
   two first air guides are connected with chamber of the shell and disposed on both sides of the shell,
   a second air outlet is disposed on one of the two first air guides towards the external of the single ducted fan,
   the second air outlet and the first air outlet are arranged in reverse or with an included angle greater than 0 degree,
   a rotation shaft for guiding the two diversion rudders to rotate is arranged on the first air outlet, and
   a first motor for driving the rotation shaft rotating is arranged on the shell.

2. The hovercraft using single ducted fan with vectoring propulsion according to claim 1, wherein
   an air-flow passage is arranged on bottom of the hull for air supply of air cushion,
   a second air guide is connected with air-flow passages and arranged on the bottom of chamber of the shell, and
   an air-inducing plate is arranged on an air inlet of the second air guide for allowing mobile air of chamber of the shell to enter the second air guide.

3. The hovercraft using single ducted fan with vectoring propulsion according to claim 2, wherein the air-inducing plate is arc-shape and projects back towards the air inlet of the second air guide.

4. The hovercraft using single ducted fan with vectoring propulsion according to claim 3, wherein the projection area of the air-inducing plate towards air inlet of the second air guide is ½~⅓ of the air inlet area.

5. The hovercraft using single ducted fan with vectoring propulsion according to claim 1, wherein the two diversion rudders are symmetrically arranged with respect to the center axis of the shell.

6. The hovercraft using single ducted fan with vectoring propulsion according to claim 1, wherein the two first air guide are symmetrically arranged with respect to the center axis of the shell.

7. The hovercraft using single ducted fan with vectoring propulsion according to claim 1, wherein the first motor is controlled by a control device arranged on the forehead of the hull.

8. The hovercraft using single ducted fan with vectoring propulsion according to claim 1, wherein the chamber of the shell presents a cone shape, in which the inner diameter decreases gradually in the direction of air inlet of the shell towards the first air outlet.

9. The hovercraft using single ducted fan with vectoring propulsion according to claim 1, wherein the oar-blade component is driven by a second motor, and wherein the second motor is driven to rotate the oar-blade component by means of a belt transmission.

* * * * *